United States Patent [19]

Ozue et al.

[11] Patent Number: 5,265,084
[45] Date of Patent: Nov. 23, 1993

[54] ROTARY DRUM ASSEMBLY WITH PUMP-OUT SPIRAL GROOVES

[75] Inventors: Tadashi Ozue; Yoshiteru Kamatani; Tatsuya Narahara, all of Kanagawa, Japan

[73] Assignee: Sony Corporation, Japan

[21] Appl. No.: 836,915

[22] Filed: Feb. 19, 1992

[30] Foreign Application Priority Data

Feb. 21, 1991 [JP] Japan .................................. 3-27489

[51] Int. Cl.⁵ .......................... G11B 7/12; G11B 15/61
[52] U.S. Cl. ...................................... 369/97; 360/107; 360/130.24
[58] Field of Search .................. 360/64, 85, 90, 93, 360/107–108, 130.22, 130.23, 130.24; 369/44.18, 97

[56] References Cited

U.S. PATENT DOCUMENTS

| | | | |
|---|---|---|---|
| 4,495,609 | 1/1985 | Russell | 369/97 X |
| 4,517,615 | 5/1985 | Hino | 360/130.24 X |
| 4,525,757 | 6/1985 | Imanishi et al. | 360/90 X |
| 4,525,828 | 6/1985 | Higashiyama et al. | 369/97 X |
| 4,641,214 | 2/1987 | Imanishi et al. | 360/130.24 |
| 4,661,941 | 4/1987 | Bell et al. | 369/97 X |
| 5,041,937 | 8/1991 | Saito | 360/85 X |

*Primary Examiner*—W. R. Young
*Attorney, Agent, or Firm*—Ronald P. Kananen

[57] ABSTRACT

A rotary drum assembly comprises a stationary member having a stationary cylindrical portion, and a rotary member having substantially the same diameter as that of the stationary member and positioned in the vicinity of the stationary member so as to be relatively stationary to the stationary member. Each of surfaces of the rotary member and the stationary member opposing to each other is formed to have a step structure having a plurality of opposed surfaces, and pump-out type spiral grooves are formed on at least two of the plurality of opposed surfaces of one of the rotary and stationary members.

5 Claims, 3 Drawing Sheets

ROTARY DRUM ASSEMBLY WITH PUMP-OUT SPIRAL GROOVES

BACKGROUND OF THE INVENTION

1. Field of the Invention

The present invention generally relates to rotary drum assemblies and, more particularly, is directed to a rotary drum assembly having rotary heads suitable for use with a recording and/or reproducing apparatus in which a signal is recorded on and/or reproduced from a recording medium having a tape-shaped configuration through the heads.

2. Description of the Prior Art

In the prior art recording and/or reproducing apparatus having rotary heads, there has been proposed a rotary drum assembly in which a rotary drum having the rotary heads attached thereto and a stationary drum are opposed to each other with a space therebetween, spiral grooves are provided on one of opposite surfaces thereof, and a tape serving as a recording medium, which is wrapped and transported around both the rotary and stationary drums, is floated from the peripheral surface of the drums by the air which is blown out from the spiral grooves with the rotation of the rotary drum.

In the thus structured rotary drum assembly wherein the spiral grooves are provided on one of the opposed surfaces of the rotary and stationary drums so far to float the tape from the surfaces thereof by the air blown out from the spiral grooves, a pressure P of the blowing out air can be represented by the following formula (1):

$$P \alpha \{3 \cdot \mu \cdot \omega \cdot (R_o^2 - R_i^2)/P_a \cdot C_r^2\} \quad (1)$$

where
- $P_a$: an atmospheric pressure
- $\mu$: a coefficient of viscosity of air
- $C_r$: a clearance (a distance of the space between the drums)
- $\omega$: an angular velocity of the rotary drum
- $R_o$: an outer diameter of the spiral grooves
- $R_i$: an inner diameter of the spiral grooves According to the formula (1), it will be understood that the blowing-out air pressure P is (a) proportional to a relative velocity (angular velocity $\omega$) of the rotary drum, (b) inversely proportional to the square of the clearance $C_r$ between the drums, and (c) proportional to a difference between the respective squares of the outer diameter $R_o$ and the inner diameter $R_i$ of the spiral grooves.

Accordingly, an amount of the tape floating, that is, a floating distance of the tape from the drum surface due to the blowing-out air pressure can be adjusted by suitably setting these parameters.

However, by some reason or when some electric circuit arrangement or optical lens or the like of an optical type head is mounted on the rotary drum, the difference between the outer and inner diameters of the spiral grooves becomes smaller. Namely, in the rotary drum assembly having the optical type head, since it is desirable to arrange its objective lens closer to the outer periphery of the drum and to provide the space (clearance) forming the air blowing-out portion closer to the optical axis of the objective lens, a width of the opposed surfaces of the rotary and stationary drums forming the space (clearance) of the air blowing-out portions can not be made large. Thus, the length of the spiral grooves become shorter and so the air blowing-out pressure becomes smaller disadvantageously.

OBJECTS AND SUMMARY OF THE INVENTION

Therefore, it is an object of the present invention to provide an improved rotary drum assembly in which the aforementioned shortcomings and disadvantages encountered with the prior art can be eliminated.

More specifically, it is an object of the present invention to provide a rotary drum assembly which can obtain an air blowing-out pressure sufficient for providing a desired floating distance of the tape.

As an aspect of the present invention, a rotary drum assembly is comprised of a stationary member having a stationary cylindrical portion, and a rotary member having substantially the same diameter as that of the stationary member and positioned in the vicinity of the stationary member so as to be relatively stationary to the stationary member, wherein each of surfaces of the rotary member and the stationary member opposing to each other is formed to have a step structure having a plurality of opposed surfaces, and pump-out type spiral grooves are formed on at least two of the plurality of opposed surfaces of one of the rotary and stationary members.

Thus, since the spiral grooves are formed on the plurality of opposed surfaces of the step structure of one of the stationary drum and the rotary drum, even if the width of the spiral grooves closest to the outer periphery of the drums can not be set larger due to the mounting of an objective lens or electric circuits and so the air blowing-out pressure therefrom becomes small, the air blowing-out pressure from other spiral grooves is superimposed thereon to thereby increase the air blowing-out pressure from the clearance between the drums, so that the desired air blowing-out pressure can be obtained.

The preceding and other objects, features, and advantages of the present invention will become apparent from the following detailed description of an illustrative embodiments thereof when read in conjunction with the accompanying drawings.

DESCRIPTION OF THE PREFERRED EMBODIMENT

An embodiment of rotary drum assembly according to the present invention will now be described with reference to FIGS. 1 and 2, in which case, the present invention is applied to an optical type recording and/or reproducing apparatus wherein an optical recording medium having a tape-shaped configuration (hereinafter referred to as an optical tape) is wrapped around a rotary drum having an optical head, and then the optical tape is transported around the rotary drum which is also being rotated to thereby optically record and reproduce a desired information on and from the optical tape.

Figure 1:
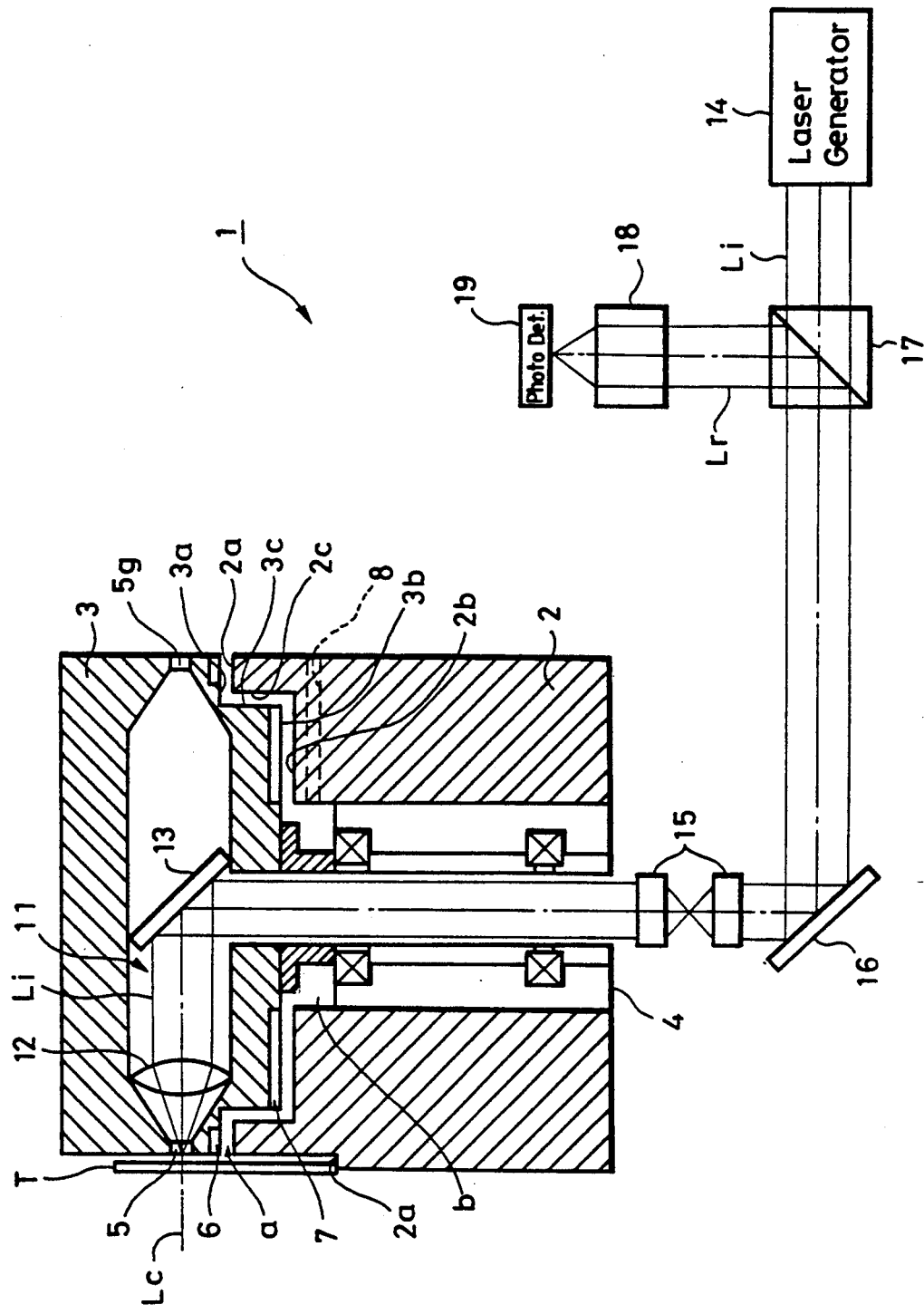
FIG. 1 shows a schematic view of an optical type recording and/or reproducing apparatus having a rotary drum assembly shown in a cross section according to an embodiment of the present invention.

FIG. 1 shows a schematic view of an optical type recording and/or reproducing apparatus 1 having a rotary drum assembly shown in a cross section according to an embodiment of the present invention. Referring to FIG. 1, a rotary drum 3 is arranged above a stationary drum 2 such that the bottom surface of the drum 3 opposes to the top surface of the drum 2 with a predetermined space a therebetween, and the rotary drum 3 is rotated by a motor 4 housed in the drum 2 at a predetermined speed.

An optical head 11 mounted within the rotary drum 3 is constituted in a manner that an objective lens 12 is disposed inside of a window hole 5 formed through the outer periphery of the rotary drum 3, and a reflecting mirror 13 opposing to the objective lens 12 with an inclination angle of 45 degrees is disposed on the rotary axis of the rotary drum 3. A pane 5g is fitted in the window hole 5. A relay lens 15 and a galvano mirror 16 are positioned between the reflecting mirror 13 and a laser oscillator or generator 14 in order to introduce an optical beam Li emitted from the laser generator 14 to the optical head 11.

According to the thus arranged rotary drum assembly, the optical beam Li emitted from the laser generator 14 is introduced to the objective lens 12 and then emitted through the window hole 5 out of the rotary drum 3, thereby being focused on a recording surface of an optical tape T which is guided by a drum lead 2a of the stationary drum 2 and wound around the rotary drum 3 to thereby form a beam spot of a predetermined configuration thereon.

Thus, the optical beam Li scans the optical tape T when the rotary drum 3 is rotated at the predetermined speed and the optical tape T is transported at the predetermined speed. Accordingly, recording tracks slanting with respect to the transporting direction of the optical tape T are formed thereon, and so desired optical informations can be recorded on the optical tape T by modulating the optical beam Li with an information signal.

Further, a polarizing beam splitter 17 is positioned between the laser generator 14 and the galvano mirror 16. Therefore, the optical beam Li emitted from the laser generator 14 and then reflected by the optical tape T returns along the same path as that of the optical beam Li as a return optical beam Lr and this return optical beam Lv is conducted to a photo detector 19 through the polarizing beam splitter 17 and a condenser lens 18. Thus, the optical information recorded on the optical tape T can be reproduced by detecting the return optical beam Lr at the photo detector 19.

In the thus arranged optical type recording and/or reproducing apparatus 1, when the optical tape T is wrapped around the drum 3 rotating with respect to the stationary drum 2 and transported, in order to smoothly transport the optical tape T around the drum 3 and to prevent wear of the optical tape T, pump-out type spiral grooves 6 are formed in the space (clearance) a between the drums 2 and 3 so far to blow out the air therefrom so that a so-called air layer, that is, an air film is forcedly formed between the tape transport surfaces (peripheral surfaces) of the drums 2 and 3 and the surface (recording surface) of the optical tape T.

The air blowing-out pressure from the spiral grooves 6 can be made larger by enlarging a difference between the inner and outer diameters of the spiral grooves 6, that is, a width thereof. Further, the air can be blown out effectively to the optical tape T by forming the spiral grooves 6 in the vicinity of the window hole 5 of the rotary drum 3 for passing therethrough the optical beam (the emitted optical beam Li and the return optical beam Lr), that is, an optical axis Lc of the optical head 11.

However, since the objective lens 12 of the optical head 11 is positioned at the inside of the window hole 5 of the rotary drum 3 for passing therethrough the optical beam (the emitted optical beam Li and the return optical beam Lr), the width of the spiral grooves 6 positioned in the vicinity of the window hole 5 can not be made larger.

According to the rotary drum assembly of this embodiment, in order to obviate this problem and to increase the air blowing-out pressure from the spiral grooves 6, each of the surfaces of the rotary drum 3 and the stationary drum 2 opposing to each other to the axial direction thereof is processed to have a step structure so as to form two stages of the opposing surface, and then other spiral grooves 7 are formed on one of the two stages of the opposing surface in addition to the spiral grooves 6 formed on the other of the two stages.

Figure 2:
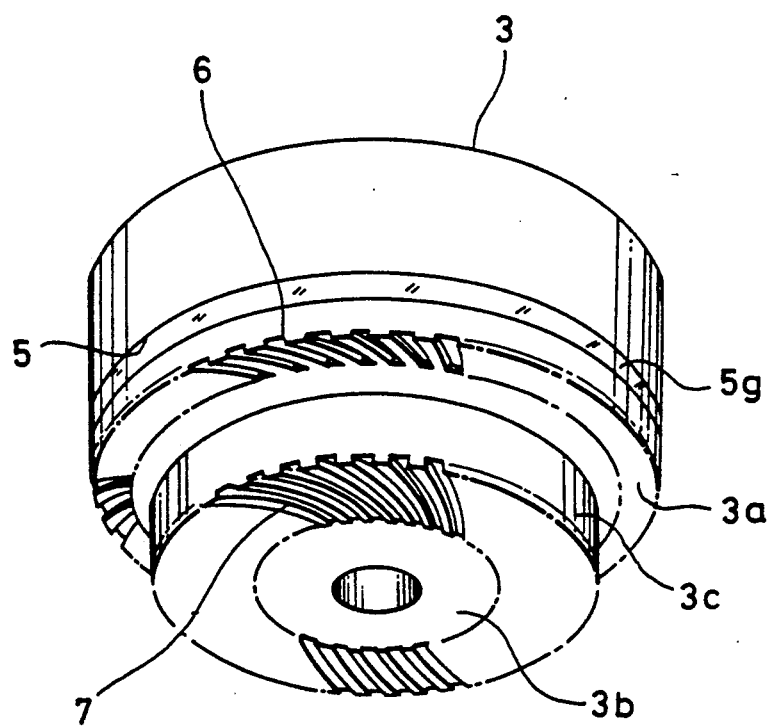
FIG. 2 shows a perspective view of a rotary drum of the rotary drum assembly shown in FIG. 1.

In the embodiment shown in FIGS. 1 and 2, the bottom surface of the rotary drum 3 opposing to the upper surface of the stationary drum 2 in the axial direction is processed to have a cylindrical step structure such that its inner and outer circular bottom surfaces (lower and upper stages) 3b and 3c are formed which are coupled through a side wall 3c extending substantially vertically. The outer circular bottom surface 3a is positioned in the vicinity of the window hole 5, that is, the optical axis Lc of the optical head 11, and the inner circular bottom surface 3b is positioned beneath the optical head 11. The spiral grooves 6 are formed on the outer circular bottom surface 3a and the other spiral grooves 7 are formed on the inner circular bottom surface 3b.

The outer circular bottom surface 3a where the spiral grooves 6 are formed is narrowed in width when compared with that of the inner circular bottom surface 3b so as to position the objective lens 12 smoothly, so that the spiral grooves 6 at the outside are narrowed in width when compared with that of the spiral grooves 7 at the inside.

The top surface of the stationary drum 2 opposing to the bottom surface of the rotary drum 3 is processed to have a cylindrical step structure so as to form inner and outer circular top surfaces (lower and upper stages) 2b and 2a and a side wall 2c extending substantially vertically which are opposing to the inner and outer circular bottom surfaces 3b and 3a and the side wall 3c with the clearance a, respectively.

The stationary drum 2 is provided with a vent hole 8 formed therethrough at the upper portion of the inner peripheral portion thereof where the motor 4 is housed, that is, at position between the rotary drum 3 and the motor 4. The vent hole 8 communicates with a space portion b which is connected to the clearance a.

Thus, according to the rotary drum assembly of this embodiment, since the spiral grooves 6 and 7 are respectively formed on the two stages of the step structure of one of the opposed surfaces of the rotary and stationary drums 2 and 3 (the rotary drum 3 in this case) opposing to each other with the clearance a, the air sucked into the space portion b of the stationary drum 2 through the vent hole 8 with the rotation of the rotary drum 3 is blown out from the opening of the clearance a through the clearance a and the spiral grooves 6 and 7 such that that the air blowing-out pressure from the clearance a is the sum of those from the spiral grooves 6 of the outer circular bottom surface 3a and the spiral grooves 7 of the inner circular bottom surface 3b. This air blowing-out pressure is increased when compared with a case where the air blowing-out pressure is only that from the spiral grooves 6 of the outer circular bottom surface 3a having the narrower width.

Thus, the air film with a desired thickness can be surely formed between the tape transport surfaces (outer peripheral surfaces) of the drums 2 and 3 and the surface (recording surface) of the optical tape T, whereby the optical tape T can be smoothly transported in the floating state from the outer peripheral surfaces of the drums 2 and 3 and hence abrasion of the optical tape T can be avoided.

Figure 3:
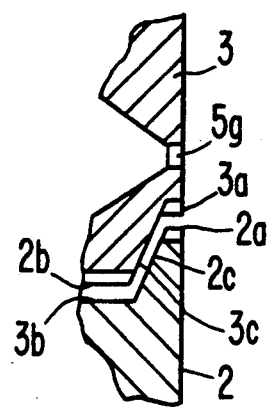
FIG. 3 shows an alternative embodiment of the rotary drum assembly.

While the described embodiment is provided with the spiral grooves 6 and 7 on the outer and inner circular bottom surfaces 3a and 3b of the rotary drum 3, the described embodiment may be provided with them on the inner and outer circular top surfaces 2b and 2a of the stationary drum 2. See FIG. 3. In this case, the present invention can obtain the same advantages as the case where the spiral grooves are provided on the rotary drum 3.

Further, other spiral grooves may be provided on the side wall 3c of the rotary drum 3 or 2c of the stationary drum 2. Furthermore, each of the opposed surfaces of the rotary and stationary drums 3 and 2 may be processed to have a cylindrical step structure having at least three stages (at least three circular surfaces) and to form at least three stages of spiral grooves thereon, whereby the air blowing-out pressure from the clearance a can be more increased.

Further, each of the side walls 2c and 3c of the drums 2 and 3 may be inclined such that the upper portion thereof is closer to the outer periphery of the drums. See FIG. 3. In this case, the air blowing-out pressure by the spiral grooves 7 formed on the inner circular surface side is more likely superimposed to that of the spiral grooves 6 formed on the outer circular surface side.

While the present invention is applied to the optical recording and/or reproducing apparatus as described above, the present invention is not limited thereto and may be applied to rotary heads of video tape recorders or the like, for example.

Further, the number of the spiral grooves and the width and the cross-sectional area thereof may be modified suitably as required, and further the cross section thereof may be formed to be V- or U-shaped configuration or the like.

As set out above, according to the present invention, since the pump-out type spiral grooves are formed on the plural stages of the step structure of one of the opposed surfaces of the rotary and stationary drums opposing to each other and each having the step structure, even if the width of the spiral grooves closest to the outer periphery of the drums can not be set larger, the air blowing-out pressure from other spiral grooves is superimposed on that from the closest spiral grooves to thereby increase the air blowing-out pressure from the clearance between the drums, so that the desired air blowing-out pressure can be obtained.

Thus, the present invention is very advantageous when being applied to the rotary drum assembly wherein a recording tape is wrapped around a rotary drum having an optical head or a magnetic head and then the recording tape is transported around the rotary drum which is also being rotated.

Having described the preferred embodiment of the invention with reference to the accompanying drawings, it is to be understood that the invention is not limited to those precise embodiment and that various changes and modifications thereof could be effected by one skilled in the at without departing from the spirit or scope of the novel concepts of the invention as defined in the appended claims.

What is claimed is

1. A rotary drum assembly comprising:
a stationary member having a stationary cylindrical portion; and
a rotary member having substantially the same diameter as that of said stationary member and positioned in the vicinity of said stationary member so as to be relatively stationary to said stationary member, wherein
each of surfaces of said rotary member and said stationary member opposing to each other is formed to have a step structure having a plurality of opposed surfaces, and
pump-out type spiral grooves are formed on at least two of said plurality of opposed surfaces of one of said rotary and stationary members.

2. A rotary drum assembly according to claim 1, wherein a wall portion of said step structure between said at least two of said plurality of opposed surfaces is inclined such that its end portion closer to outer spiral grooves is positioned closer to the outer periphery of said members.

3. A rotary drum assembly according to claim 1, wherein said spiral grooves are on the opposing surfaces of said rotary member.

4. A rotary drum assembly according to claim 2, wherein spiral grooves are formed on said wall.

5. A rotary drum assembly according to claim 1, wherein the number of opposing surfaces is 3 or more.

* * * * *